US008429990B2

(12) United States Patent
Siriowatana et al.

(10) Patent No.: US 8,429,990 B2
(45) Date of Patent: Apr. 30, 2013

(54) TOP COVER SCREW FLOATING CHECKER SYSTEM FOR HARD DISK

(75) Inventors: Phatharah Siriowatana, Bangkok (TH); Kullachat Supanyadecha, Nakhomratsima (TH); Sitthichai Theosungnern, Nakhomratsima (TH)

(73) Assignee: HGST Netherlands B.V., Amsterdam (NL)

( * ) Notice: Subject to any disclaimer, the term of this patent is extended or adjusted under 35 U.S.C. 154(b) by 730 days.

(21) Appl. No.: 12/248,136

(22) Filed: Oct. 9, 2008

(65) Prior Publication Data

US 2010/0089125 A1 Apr. 15, 2010

(51) Int. Cl.
*G01N 19/00* (2006.01)

(52) U.S. Cl.
USPC .............................. 73/865.9; 73/49.3; 73/40

(58) Field of Classification Search .............. 73/865.9, 73/761, 37, 49.2, 49.3, 40
See application file for complete search history.

(56) References Cited

U.S. PATENT DOCUMENTS

| 4,608,872 | A | 9/1986 | Mayer et al. |
| 6,539,776 | B2 * | 4/2003 | Davey ........................ 73/37 |

FOREIGN PATENT DOCUMENTS

| JP | 59116560 | | 7/1984 |
| JP | 60249543 | | 12/1985 |
| JP | 01182983 | | 7/1989 |
| JP | 01199773 | | 8/1989 |
| JP | 01240232 | | 9/1989 |
| JP | 02167676 | A * | 6/1990 |
| JP | 03068834 | | 3/1991 |
| JP | 04008429 | | 1/1992 |
| JP | 04240539 | | 8/1992 |
| JP | 05052684 | | 3/1993 |
| JP | 07280200 | | 10/1995 |
| JP | 08257849 | | 10/1996 |
| JP | 2001167550 | | 6/2001 |
| JP | 2004338043 | A * | 12/2004 |

* cited by examiner

*Primary Examiner* — Hezron E Williams
*Assistant Examiner* — Nashmiya Fayyaz (57) ABSTRACT

A system for cover screw float detection. The system includes a drive cradle coupled to a structure. The system also includes a moveable portion coupled to the structure. The system further includes a sensor coupled to said structure. The system additionally includes another sensor coupled to the moveable portion. Spatial separation between the another sensor and the sensor when the moveable portion is oriented in a screw float check position indicates presence of cover screw float in a disk drive disposed in the drive cradle.

12 Claims, 8 Drawing Sheets

TOP COVER SCREW FLOATING CHECKER SYSTEM FOR HARD DISK

TECHNICAL FIELD

The invention relates to the field of data storage devices.

BACKGROUND

Many electronic consumer products, e.g., computer systems, entertainment devices, communication devices, automobiles, etc., have numerous electronic devices and components disposed therewithin. Functions performed by the various components can include, but is not limited to, document manipulation, printing and data storage, video and audio playback, communication functions, etc.

For example, a computer system or other electronic system may utilize a hard disk drive that includes, in part, a stacked assembly of magnetic hard disks or drives within an outer housing or base containing a spindle motor assembly having a central drive hub that rotates the disks. The outer housing or base has a mated cover that when installed provides a sealed environment. The mated cover is commonly attached to the outer housing with cover screws.

During assembly and/or reassembly processes performed on the hard disk drive, instances of incomplete or inaccurate insertion of the cover screws have been observed.

SUMMARY

A system and method for cover screw float detection are described.

BRIEF DESCRIPTION OF THE DRAWINGS

The accompanying drawings, which are incorporated in and form a part of this specification, illustrate embodiments of the invention and, together with the description, serve to explain the principles of the invention.

DESCRIPTION OF EMBODIMENTS

Reference will now be made in detail to embodiment(s) of the present invention. While the invention will be described in conjunction with the embodiment(s), it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, and components have not been described in detail as not to unnecessarily obscure aspects of the present invention.

Some portions of the detailed description, which follow, are presented in terms of procedures, steps, logic blocks, processing, and other symbolic representations of operations on data bits that can be performed by computer systems. These descriptions and representations are used by those skilled in the data processing arts to most effectively convey the substance of their work to others skilled in the art. A process, etc., is here, and generally, conceived to be a self-consistent sequence of operations or instructions leading to a desired result. The operations are those requiring physical manipulations of physical quantities. Usually, though not necessarily, those quantities take the form of electrical, electronic, magnetic, optical, and/or electro-optical signals, capable of being stored, transferred, combined, compared, and otherwise manipulated in a computer system. It has been proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities. Unless specifically stated otherwise, and as apparent from the following discussions, it is noted that throughout the present invention, the terms used herein refer to the action and processes of a computer system, or similar electronic computing device, that manipulates and transforms data represented as physical (electronic) quantities within the communications and computer systems' registers and memories into other data similarly represented as physical quantities within the computer system memories or registers or other such information storage, transmission, or display device.

Figure 4:
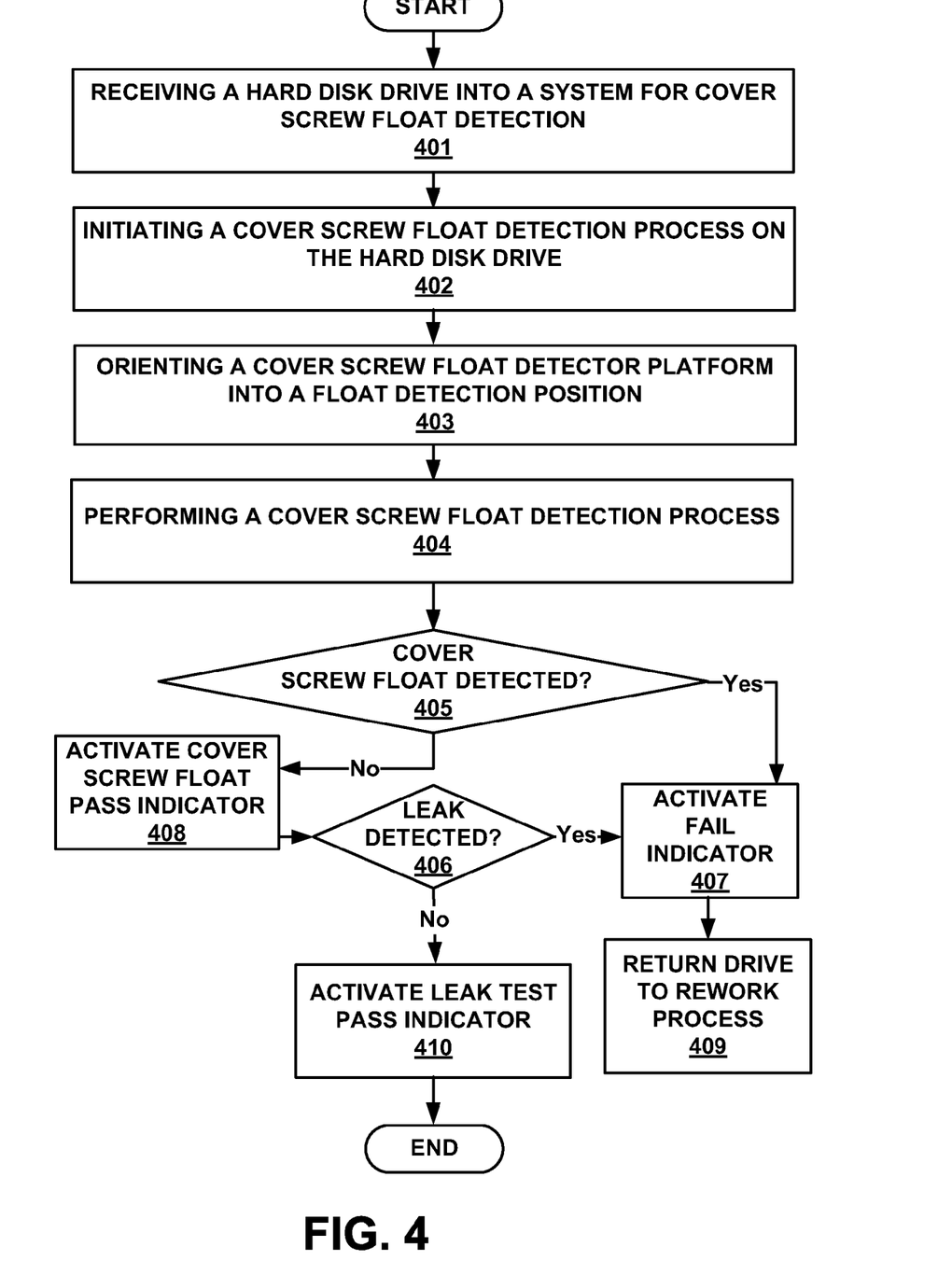
FIG. 4 is a flowchart of a process for cover screw float detection, in accordance with various embodiments of the present invention.

Certain portions of the detailed description of embodiments of the present invention, which follow, are presented in terms of processes (e.g., process 400 of FIG. 4). These processes are, in accordance with various embodiments of the present invention, carried out by processors and electrical and electronic components under the control of computer readable and computer executable instructions. The computer readable and computer executable instructions reside, for example, in registers and other features of processors, memories, and data storage features of computers executing programs and processes. However, the computer readable and computer executable instruction may reside in any type of computer readable medium. Although specific portions are disclosed in figures herein describing the operations of processes, e.g., FIGS. 2A-2D describing process 200 and FIG. 4 describing process 400, such portions are exemplary. That is, the present invention is well suited to performing various others portions or variations of the portions recited in the flowchart of the figures herein. Further, it is appreciated that the steps of the processes may be performed by software, firmware, hardware, or any combination of software and firmware and hardware.

Although embodiments of the present invention will be described in conjunction with a hard disk drive, it is understood that the embodiments described herein are useful outside of the art of hard disk drives, such as other devices that employ cover screws and in which accurate and complete insertion of the cover screw(s) is crucial. A cover screw float detection system, as applied to a hard disk drive, is an example of embodiments of the present invention and is provided herein merely for purposes of brevity and clarity.

Figure 1:
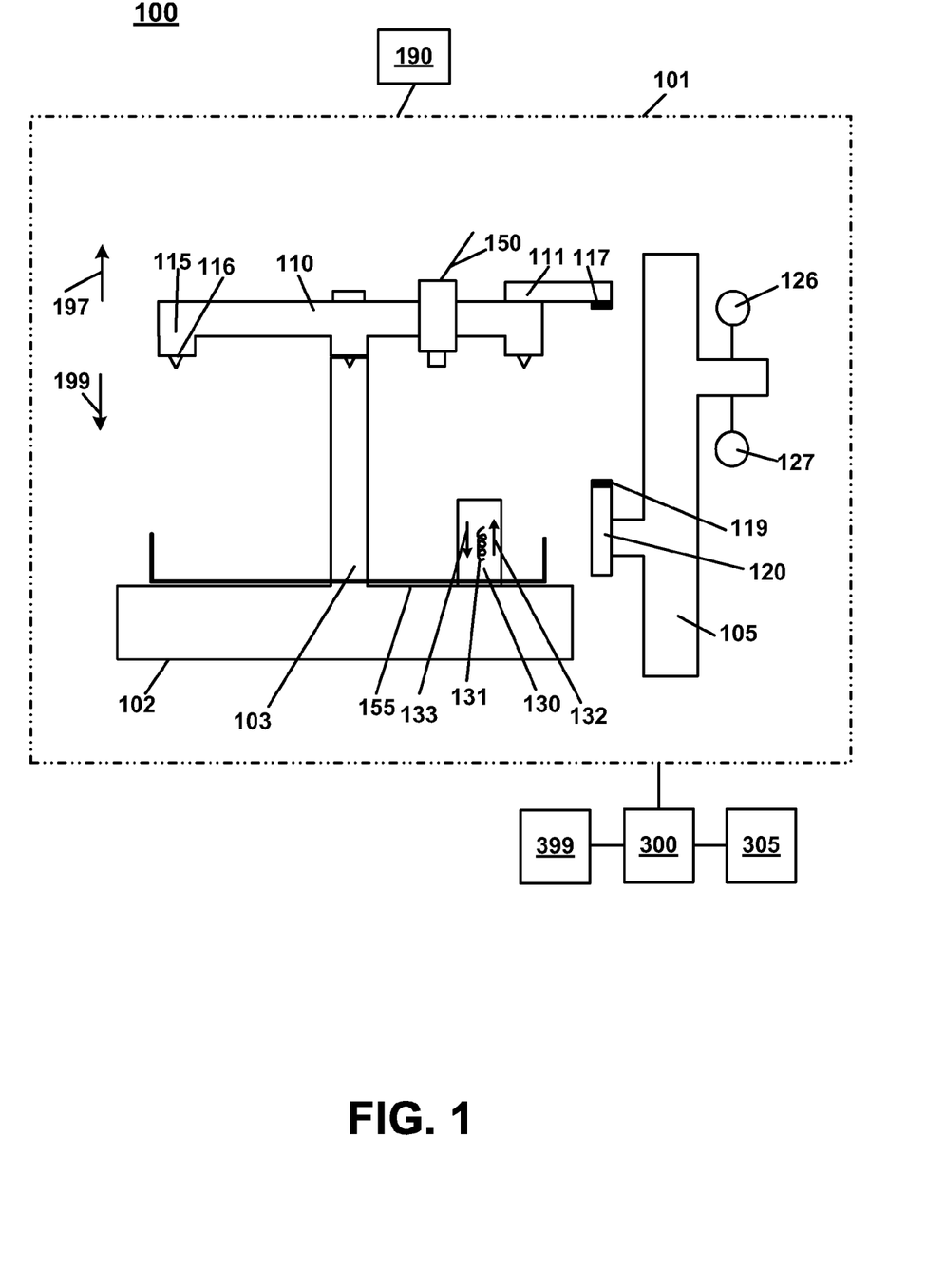
FIG. 1 is a generalized front view block diagram of a cover screw float checking system in accordance with various embodiments of the present invention.

FIG. 1 is a block diagram of an exemplary cover screw float detection system (FDS) 100 that may be utilized in a cover screw float detection process, in accordance with various embodiments of the present invention. FDS 100 is shown to include a housing structure 101. Housing structure 101 may be an enclosed structure, an open work bench type structure or other structure configured for mounting, coupling, connecting and retaining components of FDS 100. In an embodiment of the present invention, FDS 100 includes a base portion 102 that is coupled to structure 101. In an embodiment of the present invention, shown coupled to base portion 102 is a disk drive retainer 155. Retainer 155 is configured for removeable fixed retention of a disk drive disposed therewithin. In an embodiment of the present invention, retainer 155 may include a disk clamping system (not shown) to removably retain a disk drive 500. In alternative embodiments of the present invention, other retention mechanisms including, but not limited to, adhesives, levers, and the like may be implemented to provide removable fixed retention of a disk drive 500 in a retainer 155.

Figure 3:
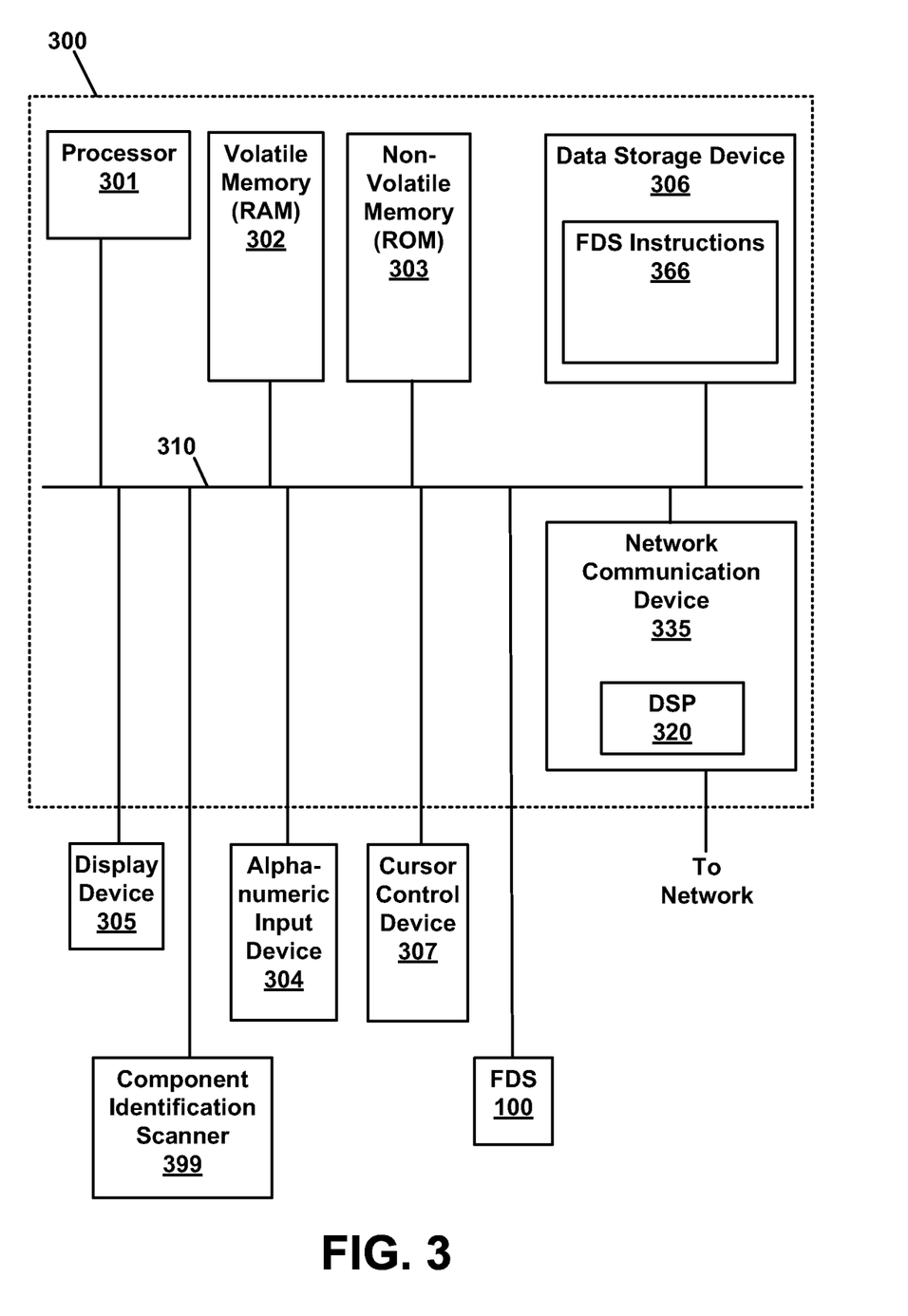
FIG. 3 is a block diagram of an exemplary computer system that may be utilized in conjunction with a cover screw float detection system, in accordance with embodiments of the present invention.

In an embodiment of the present invention, a shaft 103 is coupled to base portion 102. Shaft 103 is configured to have oriented there about a moveable platform 110. In an embodiment of the present invention, moveable platform 110 is enabled to move upward, as indicated by arrow 197, or downward, as indicated by arrow 199. In an embodiment of the present invention, a computer system, e.g., computer system 300 as described herein with reference to FIG. 3, is shown coupled to FDS 100. Computer readable instructions residing in computer system 300, e.g., instructions 366 of FIG. 3, may be implemented in a cover screw float detection process, in an embodiment of the present invention. In an embodiment of the present invention, shown coupled to FDS 100 is a detection process activator 190. Activator 190 is configured for initiating downward movement of platform 110 in conjunction with a cover screw float detection process. In an embodiment, activator 190 may be a start button, such that operations in a cover screw float detection process are automatedly performed. In the present embodiment, activator 190 is a manually operated handle, such that an operator applies a downward force thereon, so as to move platform 110 downward, as indicated by arrow 199.

In an embodiment of the present invention, a counter force device 130 is coupled to base 102. Device 130 is configured to provide resistive compression as a downward force is applied thereon, indicated by arrow 133, and resistive expansion when the downward force is removed there from, indicated by arrow 132, in accordance with various embodiments of the present invention, and as described herein with reference to FIGS. 2B-2D and FIG. 3. In an embodiment of the present invention, device 130 may be configured with a spring mechanism 131, enabling resistive compression and expansion. In alternative embodiments of the present invention, device 130 may be configured with, but is not limited to, a hydraulic device or a compressible solid, e.g., foam, to enable resistive compression and resistive expansion. As platform 110 is oriented into a cover screw float detection position, device 130 is engaged, such that a resistance to downward motion of platform 110, as indicated by arrow 199, is provided. The resistance provided by device 130 prevents excessive force from being applied to cover screws 506 of disk drive 500 of FIG. 5 during a cover screw float detection process.

Platform 110 is shown to include one or more extrusions 115, each having a cover screw drive bit 116 coupled therewith, in an embodiment of the present invention. Each drive bit 116 is configured for interoperability with a cover screw of a disk drive upon which a cover screw float detection process is performed, e.g., cover screws 506 of hard disk drive 500 of FIG. 5. In an embodiment of the present invention, platform 110 also includes a sensor 111 having a sensing element 117 coupled therewith. Sensing element 117 is configured for interoperability with sensing element 119 of sensor 120. In an embodiment of the present invention, platform 110 is shown to also include a disk drive leak tester 150. In an embodiment of the present invention, leak tester 150 is configured for interoperability with a leak test valve present in a disk drive, e.g., valve 550 of disk drive 500 of FIG. 5. In an embodiment of the present invention, leak tester 150 applies a vacuum upon the cover 512 of housing 511 of drive 500 to ensure a sealed environment. In an embodiment of the present invention, leak tester 150 may be activated concurrent with or subsequent to a cover screw float detection process.

Still referring to FIG. 1, FDS 100 is shown to further include a fixed sensor support member 105. Member 105 includes a sensor 120 having a sensing device 119, in an embodiment of the present invention. Member 105 further includes one or more test result indicators, e.g., indicator 126 and indicator 127. In an embodiment of the present invention, indicator 126 is configured as a pass indicator and indicator 127 is configured as a fail indicator. In the present embodiment, indicator 126 may be a green colored indicator and indicator 127 may be red colored indicator. In alternative embodiments of the present invention, indicators 126 and 127 can provide a variety of determinable indications including, but which are not limited to, differing audible sounds, constant and flashing lights, or other manner in which different results may be differently represented.

In an embodiment of the present invention, FDS 100 further includes a disk drive identification reader, e.g., a disk drive component scanner 399. In an embodiment of the present invention, scanner 399 may be configured to read a serial number, a cell ID number, or other unique identifier associated with a disk drive 500 upon which a cover screw float detection process is to be performed. Scanner 399 is, in an embodiment, coupled with computer system 300. The identification information obtained by scanner 399 is transmitted to computer system 300, and in an embodiment of the present invention is used to retrieve disk drive specifications and other related information associated with disk drive 500. Disk drive specifications may be stored in a data storage device, e.g., data storage device 306 of FIG. 3. In an embodiment of the present invention, the disk drive specifications retrieved by computer system 300 may provide various technical data including, but not limited to, a maximum spatial distance between sensor element 117 and sensor element 119 when a cover screw float detection process is performed. In an embodiment of the present invention, scanner 399 may be operator initiated. In an alternative embodiment of the present invention, scanner 399 may be automatedly initiated.

In an example, a disk drive 500 has a particular height or thickness when the cover screws 506 are correctly and completely inserted. Utilizing the known thickness of disk drive 500 including cover screws 506, embodiments of the present invention can provide a sensor element to sensor element maximum separation distance determination, such that for each disk drive 500, there is a maximum element-to-element separation distance. In accordance with various embodiments of the present invention, thinner disk drives 500 would have a smaller maximum separation distance and thicker disk drives 500 would have a larger maximum separation distance. In an embodiment of the present invention, during a cover screw float detection process that is performed on a disk drive 500, if the maximum separation distance is exceeded, FDS 100 may indicate the detection of cover screw float, e.g., by activating failure indicator 127. Conversely, if the maximum separation distance is achieved, FDS 100 may activate pass indicator 126. In an alternative embodiment, FDS 100 may also implement a display device, e.g., display device 305 of FIG. 3, to relay this information to the operator and/or the automated functionalities included in FDS 100.

Referring collectively to FIGS. 2A-2D, shown are sequential illustrations of a cover screw float detection process 200 performed upon a hard disk, in accordance with an embodiment of the present invention.

Figure 2A:
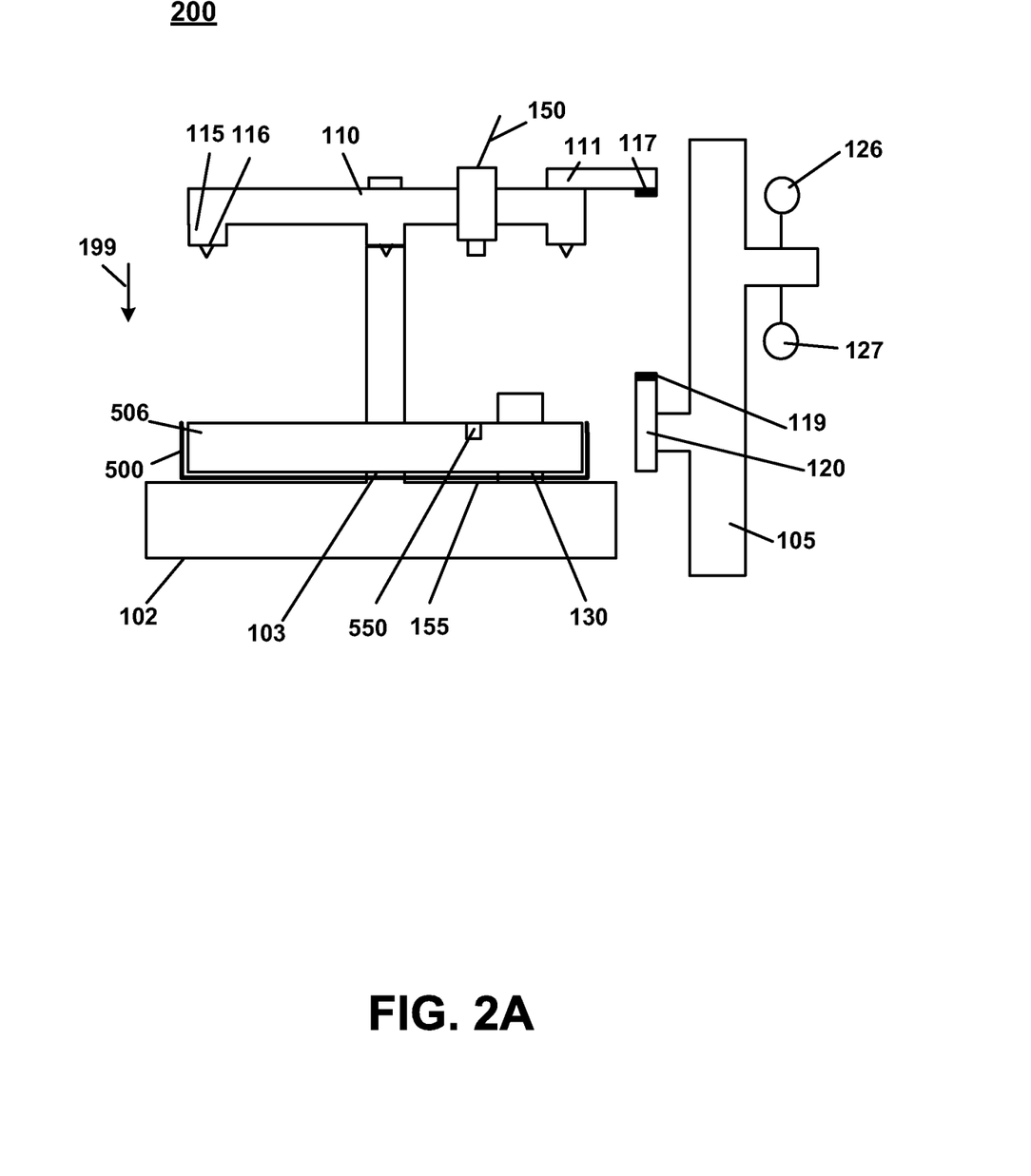
FIG. 2A is a block diagram representation of an initial operation in a process for detecting cover screw float, in accordance with an embodiment of the present invention.

FIG. 2A is an initial operation in cover screw float detection process 200, in an embodiment of the present invention. FIG. 2A shows a disk drive 500 positioned in retainer 155 of FDS 100 of FIG. 1, in accordance with embodiments of the present invention. In an embodiment of the present invention, an operator has manually inserted drive 500 in retainer 155. In an alternative embodiment of the present invention, drive 500 may be automatedly disposed in retainer 155.

In an embodiment of the present invention, drive 500 identifiers, e.g., one or more bar codes or other unique identifiers, may be scanned and inputted to computer system 300. In an embodiment of the present invention, a scanner 399 of computer system 300 may be implemented. Information contained in the identifiers can include, but which is not limited to, storage capacity, drive speed, dimensions including housing thickness, drive model number, cover screw type, cover screw torque specifications, and so on. In accordance with embodiments of the present invention, scanning may be operator or automatedly performed.

Figure 2B:
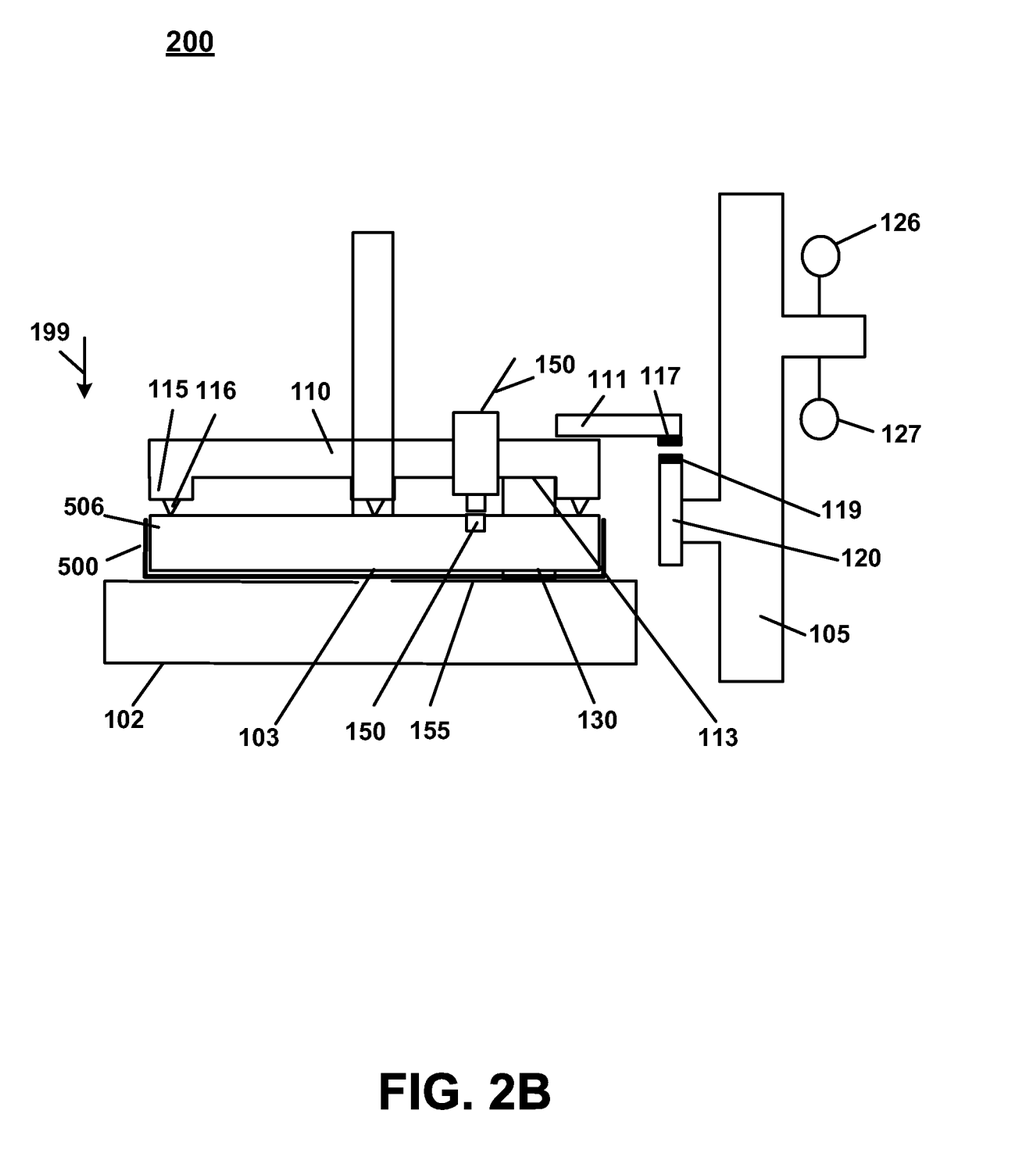
FIG. 2B is a sequential block diagram of the process of FIG. 2A, in an embodiment of the present invention.

FIG. 2B is sequential block diagram of the cover screw float detection process 200 of FIG. 2A. FIG. 2B shows that platform 110 have been motioned downward, as indicated by arrow 199, in an embodiment of the present invention. In the present embodiment, downward movement of platform 110 causes platform 110 to contact device 130, indicated as contact position 113. Additionally, sensing element 117 of sensor 111 of platform 110 is shown in proximity to sensing element 119 of sensor 120 of member 105. In accordance with embodiments of the present invention, platform 110 contacting device 130 activates the resistive force as provided by spring 131. As continued downward motion of platform 110 is realized, the resistive force provided by spring 131 of device 130 increases, so as prevent excessive downward force from being applied to platform 110, in an embodiment of the present invention.

Figure 2C:
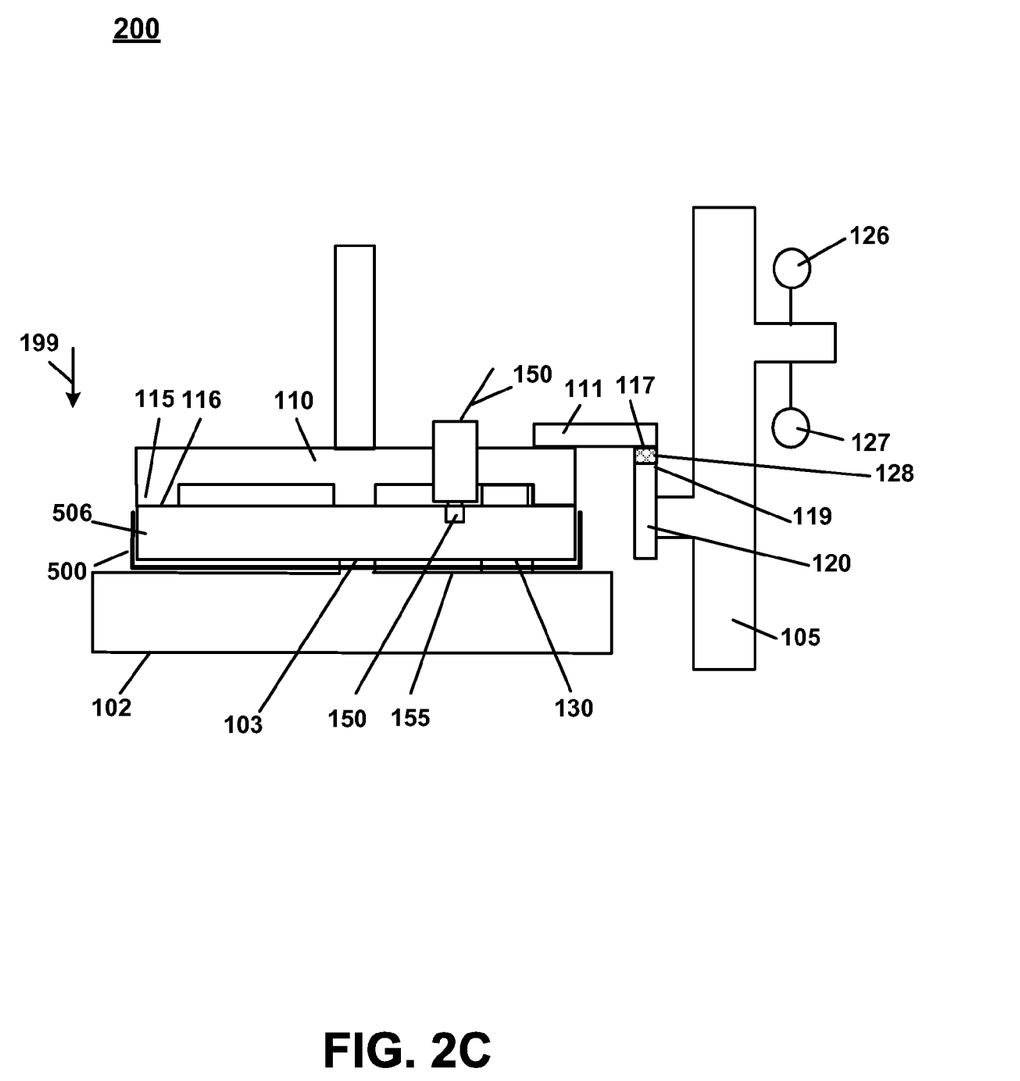
FIG. 2C is a sequential block diagram of the process of FIG. 2B, in an embodiment of the present invention.

FIG. 2C is a sequential diagram of the cover screw float detection process of FIG. 2B, in an embodiment of the present invention. FIG. 2C illustrates that platform 110 has been motioned further downward, indicated by arrow 199, such that each drive bit 116 has fully engaged an associated cover screw 506 of disk drive 500. In the present embodiment, disk drive 500 is of a thickness such that when drive bits 116 are fully engaged with cover screws 506 during a cover screw float detection process 200, sensor element 117 is in contact with sensor element 119, verifying correct and complete insertion of cover screws 506.

In accordance with embodiments of the present invention, sensor element 117 is shown as contacting sensor element 119, indicated as separation distance 128. In the present embodiment, as contact between element 117 and 119 is indicative of no cover screw float being detected, FDS 100 may activate pass indicator 126 to indicate no cover screw float detection. In another embodiment of the present invention, FDS 100 may utilize a display device, e.g., display device 305, to indicate that no cover screw float has been detected.

Still with reference to FIG. 2C, in an embodiment of the present invention, subsequent to no cover screw float being detected, FDS 100 may proceed with activation of leak tester 150 to perform a leak test on disk drive 500.

Figure 2D:
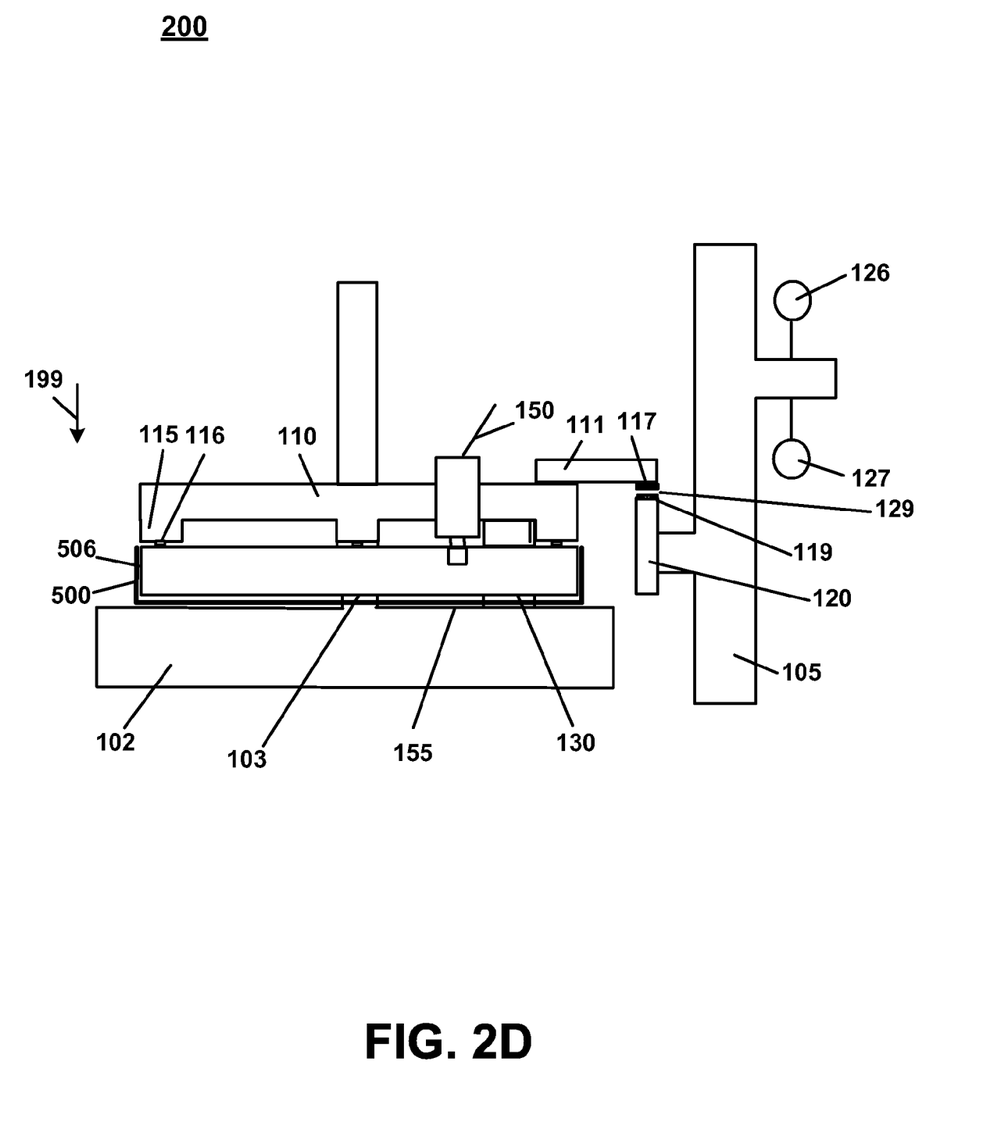
FIG. 2D is a sequential block diagram of the process of FIG. 2B, in an embodiment of the present invention.

FIG. 2D is a sequential diagram of the cover screw float detection process of FIG. 2B, in an embodiment of the present invention. FIG. 2D illustrates that platform 110 has been motioned further downward, indicated by arrow 199, such that each drive bit 116 has not fully engaged an associated cover screw 506 of disk drive 500. In the present embodiment, because one or more of cover screws 506 have not been correctly and completely installed on disk drive 500, sensor element 117 is not in contact with sensor element 119, indicated as separation distance 129.

In accordance with embodiments of the present invention, sensor element 117 is shown as not contacting sensor element 119, indicated as separation distance 129. In the present embodiment, as no contact between element 117 and 119 is indicative of cover screw float being detected, FDS 100 may activate fail indicator 127 to indicate detection of cover screw float. In another embodiment of the present invention, FDS 100 may utilize a display device, e.g., display device 305, to indicate that cover screw float has been detected.

Still with reference to FIG. 2D, in an embodiment of the present invention, subsequent to cover screw float being detected, FDS 100 may or may not proceed with activation of leak tester 150 to perform a leak test on disk drive 500.

FIG. 3 is a block diagram illustrating an exemplary computer system 300 that can be used in accordance with embodiments of the present invention. It is noted that computer system 300 can be nearly any type of computing system or electronic computing device including, but not limited to, a server computer, a desktop computer, a laptop computer, or other portable electronic device. Within the context of the present invention, certain discussed processes, procedures, and steps are realized as a series of instructions (e.g., a software program) that reside within computer system memory units of computer system 300 and which are executed by a processor(s) of computer system 300, in one embodiment. When executed, the instructions cause computer system 300 to perform specific actions and exhibit specific behavior which is described in detail herein.

Computer system 300 of FIG. 3 comprises an address/data bus 310 for communicating information, one or more central processors 301 coupled to bus 310 for processing information and instructions. Central processor(s) 301 can be a microprocessor or any alternative type of processor. Computer system 300 also includes a computer usable volatile memory 302, e.g., random access memory (RAM), static RAM (SRAM), dynamic RAM (DRAM), synchronous dynamic RAM (SDRAM), double data rate RAM (DDR RAM), etc., coupled to bus 310 for storing information and instructions for processor(s) 301. Computer system 300 further includes a computer usable non-volatile memory 303, e.g., read only memory (ROM), programmable ROM, electronically programmable ROM (EPROM), electrically erasable ROM (EEPROM), flash memory (a type of EEPROM), etc., coupled to bus 310 for storing static information and instructions for processor(s) 301. In an embodiment, non-volatile memory 303 can be removable.

System 300 also includes one or more signal generating and receiving devices, e.g., signal input/output device(s) 335 coupled to bus 310 for enabling computer 300 to interface with other electronic devices via a network (not shown). Communication interface 335 can include wired and/or wireless communication functionality. For example, in one embodiment, communication interface 335 is an Ethernet adapter, but can alternatively be one of a number of well known communication standards and protocols, e.g., a parallel port, a serial communication port, a FireWire (IEEE 1394) interface, a Universal Serial Bus (USB), a small computer system interface (SCSI), an infrared (IR) communication port, a Bluetooth wireless communication adapter, a broadband connection, and the like. In another embodiment, a digital subscriber line (DSL) can be implemented as signal input/output device 335. In such an instance, communication interface 835 may include a DSL modem. The network, to which computer system 300 may be coupled, may be, but is not limited to, a client/server network, an intranet network, an internet network, or any other network enabling intercommunication between two or more computer systems.

Still referring to FIG. 3, network communication device 335, in an embodiment, includes an optional digital signal processor (DSP) 320 for processing data to be transmitted or data that are received via network communication device 335. Alternatively, processor 301 can perform some or all of the functions performed by DSP 320.

Computer 300 of FIG. 3 can also include one or more computer usable data storage device(s) 306 coupled to bus 310 for storing instructions and information, in one embodiment of the present invention. In one embodiment, data storage device 306 can be a magnetic storage device, e.g., a hard disk drive, a floppy disk drive, a zip drive, or other magnetic storage device. In another embodiment, data storage device 806 can be an optical storage device, e.g., a CD (compact disc), a DVD (digital versatile disc), or other alternative optical storage device. Alternatively, any combination of magnetic, optical, and alternative storage devices can be implemented, e.g., a RAID (random array of independent disks) configuration. It is noted that data storage device 306 can be located internal and/or external of system 300 and communicatively coupled with system 300 utilizing wired and/or wireless communication technology, thereby providing expanded storage and functionality to system 300. It is further noted that nearly any portable electronic device can also be communicatively coupled with system 300 via utilization of wired and/or wireless technology, thereby expanding the functionality of system 300. In an embodiment of the present invention, instructions, specifications, and tolerances related to disk drives upon which a cover screw float detection process is to be performed may be stored in storage device 306, e.g., instructions 366. Although instructions 366 are shown wholly disposed in storage device 306, instructions 366 may alternatively be stored in volatile memory 302, non-volatile memory 303, or in a combination of memory 302, memory 303 and storage device 306, in accordance with various embodiments of the present invention.

System 300 can also include one or more optional display devices 305 coupled to bus 310 for displaying video, graphics, and/or alphanumeric characters. It is noted that display device 305 can be a CRT (cathode ray tube), a thin CRT (TCRT), a liquid crystal display (LCD), a plasma display, a field emission display (FED), a television or any other display device or combinations of display devices suitable for displaying video, graphics, and alphanumeric characters recognizable to a user. In an embodiment of the present invention, display device 805 may be a touch screen display device.

Computer system 300 of FIG. 3 further includes an optional alphanumeric input device 304 coupled to bus 310 for communicating information and command selections to processor(s) 301, in one embodiment. Alphanumeric input device 304 is coupled to bus 310 and includes alphanumeric and function keys. Also included in computer 300 is an optional cursor control device 307 coupled to bus 310 for communicating user input information and command selections to processor(s) 301. Cursor control device 307 can be implemented using a number of well known devices such as a mouse, a trackball, a track pad, a joy stick, a optical tracking device, a touch screen, etc. It is noted that a cursor can be directed and/or activated via input from alphanumeric input device 804 using special keys and key sequence commands. It is further noted that directing and/or activating the cursor can be accomplished by alternative means, e.g., voice activated commands, provided computer system 300 is configured with such functionality.

In an embodiment of the present embodiment, system 300 may be configured with a component identification scanner 399 for identifying each component subjected to a cover screw float detection process in accordance with embodiments of the present invention. Each component, e.g., a hard disk drive 500, may have one or more unique identifiers disposed thereon. Types of unique identifiers can include, but which is not limited to, bar codes, RFID, or other means of uniquely identifying each disk drive. Scanner 399 may be configured to initiate a cover screw float detection process appropriate for the unique identifier present on the disk drive subject to the float detection process.

In an embodiment of the present invention, computer system 300 may be coupled to one or more cover screw float result indicators, e.g., pass indicator 128 and fail indicator 128, as described herein with reference to FIG. 1 and FIGS. 2A-2D and FIG. 4.

FIG. 4 is a flowchart of a process 400 for cover screw float detection in which particular operations are performed in accordance with various embodiments of the present invention. Although specific operations are disclosed in process 400, such operations are exemplary. That is, the present invention is well suited to performing various other operations or variations of the operations recited in FIG. 4. Within the present embodiment, it should be appreciated that the operations of process 400 may be performed by software, by hardware, by an assembly mechanism, through human interaction, or by any combination of software, hardware, assembly mechanism, and human interaction.

Process 400 for cover screw float detection will be described with reference to components and devices shown in FIGS. 1 and 2A-2D, in accordance with embodiments of the present invention.

Figure 5:
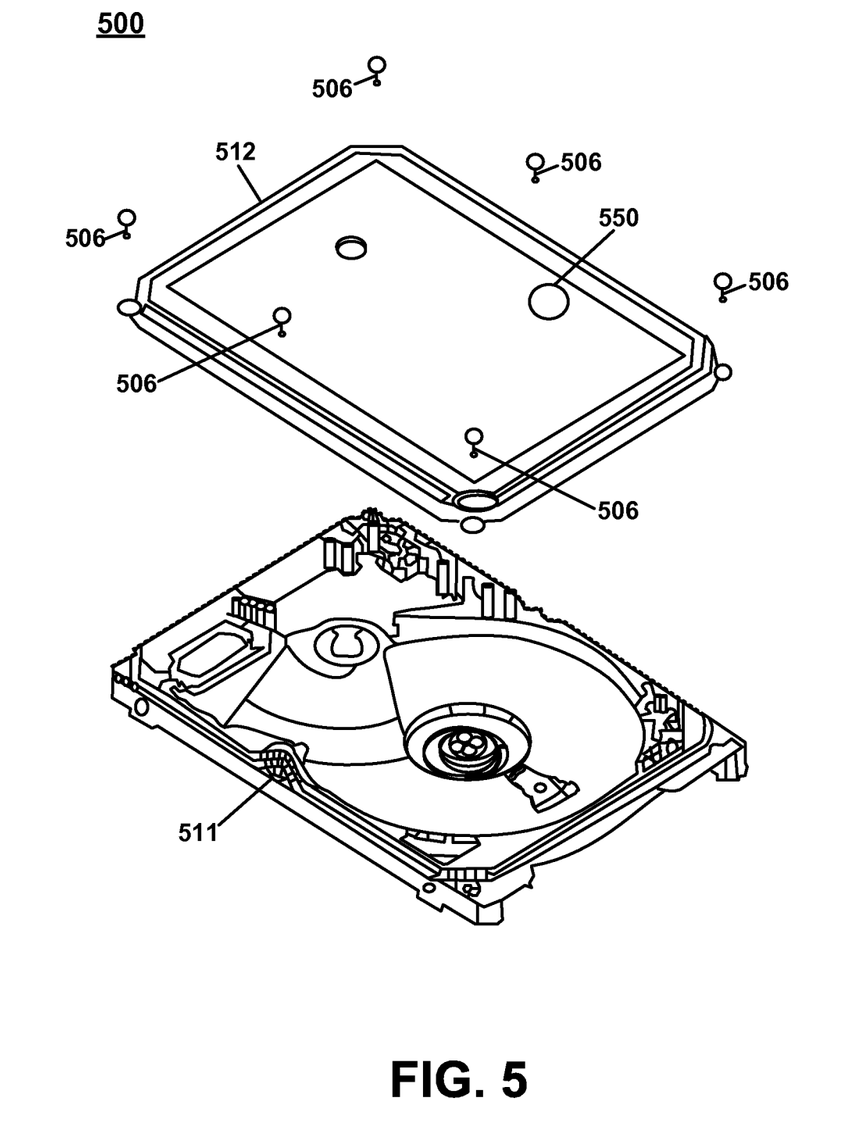
FIG. 5 is an illustration of a hard disk drive upon which various embodiments of the present invention may be practiced.

In operation 401 of process 400, a data storage device, e.g., hard disk drive 500 of FIG. 5, is received in a component retainer of FDS 100, e.g., disk drive retainer 155 of FIG. 1, as shown in FIG. 2A, in an embodiment of the present invention. In an embodiment of the present invention, the received hard disk drive 500 is oriented such that cover screws, e.g., cover screws 506 of FIG. 5, are facing toward platform 110 and thus toward drive bits 116. In an embodiment of the present invention, hard disk drive 500 may be manually placed onto retainer 155. Alternatively, hard disk drive 500 may be automatedly placed onto retainer 155.

In an embodiment of the present invention, an identifier on the hard disk drive 500, e.g., a bar code identifier, is scanned, via a scanner 399 into FDS 100 prior to placing the hard disk drive into retainer 155 of FDS 100. In an embodiment, the hard disk drive identifier is manually scanned. Alternatively, scanning may be performed automatedly. In yet another embodiment, an alternative hard disk drive identifier, e.g., a model number, a serial number, may be operator inputted into FDS 100.

In operation 402 of process 400, a cover screw float detection process commences subsequent to activating cover screw float detection system 100, in accordance with embodiments of the present invention. In an embodiment of the present invention, an operator may manually operate activator 190 when activator 190 is a manually operated handle, as described herein with reference to FIG. 1. In an alternative embodiment, an operator may press activator 190 when activator 190 is a start button, also as described herein with reference to FIG. 1. Alternatively, automated activation may be implemented.

In operation 403 of process 400, platform 110 is motioned downward to a cover screw float detection position, as shown in FIG. 2C and FIG. 2D. In an embodiment of the present invention, platform 110 is manually positioned, e.g., by operator action. Alternatively, motioning of platform 110 may be performed automatedly. In accordance with an embodiment of the present invention, it is noted that further downward motion of platform 110 will meet with resistance as provided by device 130, as described herein with reference to FIG. 1.

In operation 404 of process 400, disk drive 500 is subjected to a cover screw float detection process, as described herein with reference to FIGS. 2A-2D, in accordance with various embodiments of the present invention. In an embodiment of the present invention, each drive bit 116 may be configured to rotate freely about an axis, such that each drive bit 116 readily aligns with and fully seats within each cover screw 506 head. In an alternative embodiment of the present invention, it is noted that drive bit 116 may not be a drive bit, but rather a pointed projection that is configured for disposition in cover screw 506 head.

In operation 405 of process 400, if it is determined that cover screw float is detected, e.g., separation distance 129 as described herein with reference to FIG. 2D, process 400 proceeds to operation 407, in an embodiment of the present invention. In operation 405, if cover screw float is not detected, e.g., separation distance 128 as described herein with reference to FIG. 2C, process 400 proceeds to operation 408.

If operation 405 detects cover screw float (separation distance 129), FDS 100 may activate a float detection indicator, e.g., failure indicator 127. Additionally, FDS 100 may also utilize a display device 305 to convey cover screw float detection. In an embodiment of the present invention, FDS 100 may be configured to bypass a leak test, e.g., leak test 406, upon detection of cover screw float. In an embodiment of the present invention, FDS 100 may be configured to cause disk drive 500 to be rejected from process 400 and be returned to a rework process, shown as operation 409. A rework process may include, but is not limited to, removal and reinstallation of cover screws 506. Subsequent to a rework process, disk drive 500 may then be subjected to cover screw float detection process 400. In an alternative embodiment of the present invention, FDS 100 may perform a leak test 406 when cover screw float is detected.

If operation 405 determines that no cover screw float is present, shown as separation distance 128 of FIG. 2C, in operation 408 FDS 100 may activate a no cover screw float detection indicator, e.g., float pass indicator 126, in an embodiment of the present invention. Additionally, FDS 100 may also utilize a display device 305 to convey cover screw float absence. In an embodiment of the present invention, if the absence of cover screw float is determined, FDS 100 may subsequently perform a leak test, e.g., leak test 406.

In operation 406 of process 400, if a leak is detected during a leak test 406, process 400 may return to operation 407, activating a failure indicator, and accordingly proceed to operation 409, returning disk drive 500 to a rework process, in an embodiment of the present invention.

In operation 406 of process 400, if no leak is detected in leak test 406, process 400 proceeds to operation 410, in accordance with an embodiment of the present invention.

In operation 410 of process 400, upon a leak test returning negative results, e.g., no leaks detected, FDS 100 may activate a leak test pass indicator, e.g., pass indicator 126 of FIG. 2A-2D, in accordance with various embodiments of the present invention. Subsequent to the completion of operation 410, process 400 may be terminated. Alternatively, process 400 may be reinitiated.

With reference now to FIG. 5, shown is a disk drive upon which a process for cover screw float detection may be performed in accordance with various embodiments of the present invention. Disk drive 500 is shown to include an outer housing 511 in which the internal workings of a hard disk drive are disposed. Hard disk drive 500 further includes a cover portion 512 that is appropriately configured (mated) for disposition upon outer housing 511, such that when cover 512 is in place, a sealed HDD exists.

Hard disk drive 500 also includes a leak test valve 550 that is utilized during a leak test performed thereon. Hard disk drive 500 further includes a plurality of cover screws 506 for securely fastening cover portion 512 to outer housing 511. It is upon cover screws 506 that embodiments of the present invention are practiced, as described herein with reference to FIGS. 1, 2A-2D and 4.

Embodiments of the present invention, in the various presented embodiments, provide a system and method for cover screw float detection.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments described herein were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system for cover screw float detection, said system comprising:
   a disk drive retainer coupled with a top portion of a base structure, said base structure coupled with a housing structure, said disk drive retainer configured to receive a hard disk drive with a leak test valve;
   a moveable portion coupled to said top portion of said base structure, said movable portion configured to move vertically with respect to said base structure and with respect to said housing structure;
   a sensor for screw float check coupled to a support member coupled with said base structure;
   another sensor coupled to said moveable portion, wherein spatial separation between said another sensor and said sensor when said moveable portion is oriented in a screw float check position indicates presence of cover screw float in a disk drive disposed in said drive retainer; and a leak tester coupled with said moveable portion configured to couple with said leak test valve of said hard disk drive and configured to determine if said hard disk drive is sealed, wherein said leak tester is operable during said screw float check.

2. The system as recited in claim 1 further comprising:

a plurality of drive bits coupled with said moveable portion, wherein each drive bit is configured to engage an associated cover screw of said disk drive while said moveable portion is in said screw float check position.

3. The system as recited in claim 1 further comprising:

a resistive mechanism coupled with said base structure and configured to contact said moveable portion and provide movement resistance when each drive bit in a plurality of drive bits engages each associated cover screw in a plurality of cover screws.

4. The system as recited in claim 1 further comprising:

a cover screw float indicator for indicating when a threshold spatial distance between said sensor and said another sensor is not achieved.

5. The system as recited in claim 1 further comprising:

a cover screw non-float indicator for indicating when a threshold spatial distance between said sensor and said another sensor is achieved.

6. A method for cover screw float detection comprising:

receiving a disk drive with a leak test valve in a drive retainer, said drive retainer coupled with a top portion of a base structure, said base structure coupled with a housing structure;

orienting a moveable portion coupled with said top portion of said base structure to a screw float check position, said moveable portion configured to move vertically with respect to said base portion and with respect to said housing structure;

engaging a drive bit with an associated cover screw of said hard drive, said drive bit of a plurality of drive bits, said plurality of drive bits coupled with said moveable portion; and determining the spatial separation between a sensor for screw float check coupled with a support member coupled with said structure and another sensor coupled with said moveable portion when said moveable portion is in said screw float check position; and engaging a leak tester coupled with said movable portion with said leak test valve of said hard disk drive and determining if said hard disk drive is sealed, wherein said leak detector is operable during said screw float check.

7. The method as recited in claim 6 wherein said receiving further comprises:

removably affixing said disk drive in said drive retainer.

8. The method as recited in claim 6 further comprising:

generating a resistive force against said moveable portion when said moveable portion is oriented in said screw float check position.

9. The method as recited in claim 6 further comprising:

comparing said spatial separation with a threshold spatial separation.

10. The method as recited in claim 9 further comprising;

indicating presence of cover screw float when said threshold spatial separation is not achieved.

11. The method as recited in claim 9 further comprising:

indicating absence of cover screw float when said threshold spatial separation is achieved.

12. The method as recited in claim 10 further comprising:

applying a vacuum to leak test valve of said disk drive, said applying a vacuum for leak testing said disk drive.

\* \* \* \* \*